Patented July 7, 1931

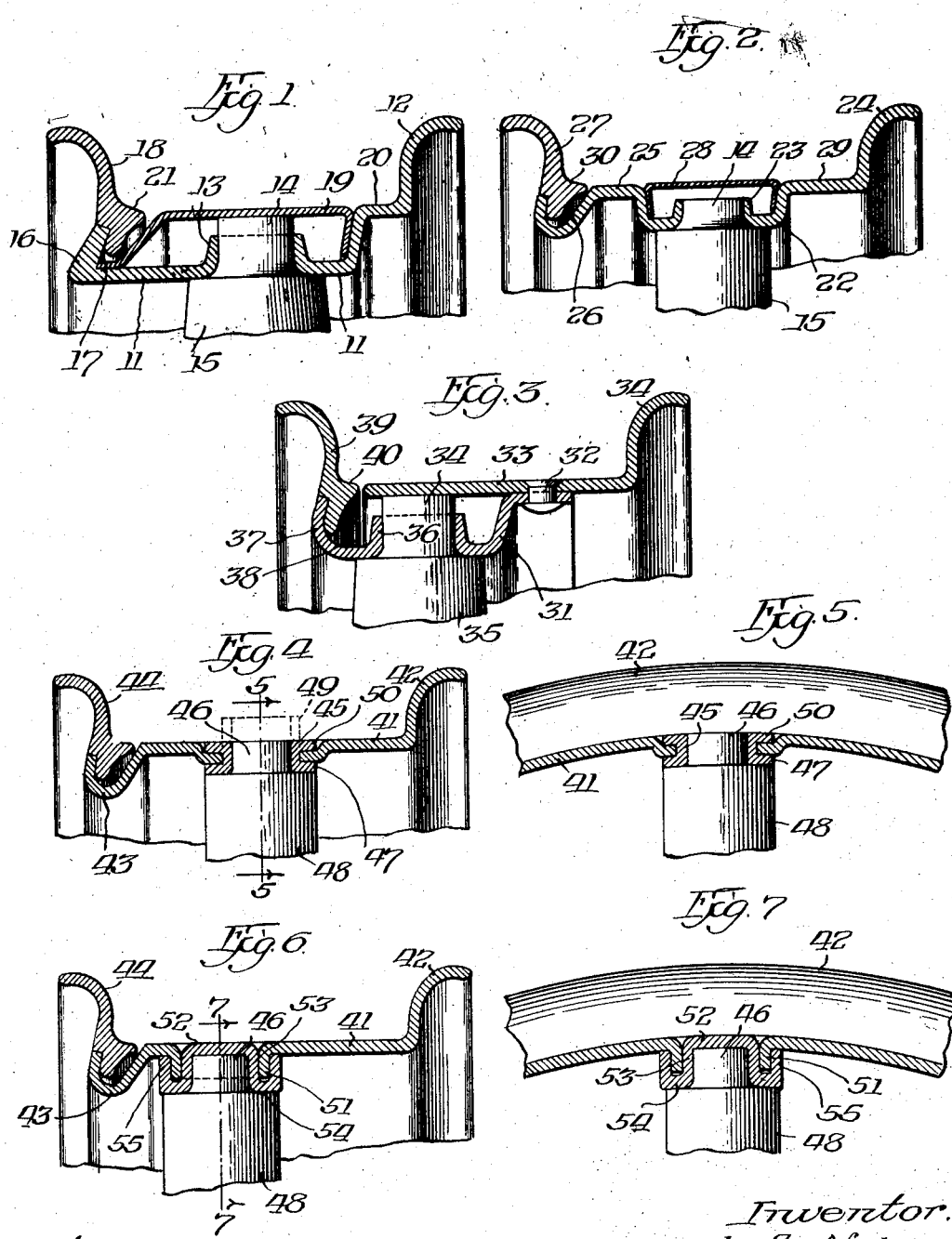

1,813,192

UNITED STATES PATENT OFFICE

EMIL A. NELSON, OF DETROIT, MICHIGAN, ASSIGNOR TO MOTOR WHEEL CORPORATION, OF LANSING, MICHIGAN, A CORPORATION OF MICHIGAN

FELLY AND RIM CONSTRUCTION

Application filed September 28, 1927. Serial No. 222,434.

In the wheel art the importance is recognized of cutting down the peripheral weight so far as is compatible with strength and rigidity. Excess weight is largely centralized in the felly region and, in the case of wood spoke wheels, is primarily due to the necessity of providing a firm anchorage for the spoke ends and a rigid seat for the rim.

By my invention I avoid this disadvantageous condition by so constructing the parts entering the spoke-felly-rim assembly that their functions are in a measure combined, with consequent reduction of weight and increased simplicity of operation.

Several embodiments of the invention are set forth in the accompanying drawings, wherein the tire-carrying rim is made to serve the function of a spoke-anchoring felly. In these drawings, Figs. 1, 2, 3, 4 and 6 are transverse sections through modified forms of structures in accordance with the invention; and Figs. 5 and 7 are fragmentary sections taken at right angles to Figs. 4 and 6 respectively.

In the structures illustrated by way of example, and having reference first to that shown in Fig. 1 of the drawings, the rim is of the drop base type, the base 11 having at the rear an integral fixed tire-retaining flange 12 and is apertured and outwardly flanged at intervals corresponding to the location of the spokes as indicated at 13 to receive the tenons 14 of the spokes 15. The rim base is upturned along its forward edge as indicated at 16 to form a gutter 17 for the reception of the removable tire-retaining ring or flange 18. The drap base of the rim is adopted to receive a metal band 19 encircling the spoke ends to form a shield and support for the tire tube, this shield being flush with the tire seat formed by the portions 20 of the rim and 21 of the detachable ring.

The rim structure illustrated in Fig. 2 of the drawings comprises a drop base rim, the base 22 being apertured and outwardly flanged as illustrated at 23 to receive the tenons 14 of the spokes 15, the rim being provided with a rear fixed tire-retaining flange 24. In this instance that portion of the rim in front of the spoke seat, instead of extending forward in the plane of the rim base, is rebent outwardly as indicated at 25 and then downwardly and outwardly to form the gutter 26 for the reception of the removable tire-retaining ring or flange 27. In this instance a symmetrically formed band 28 is seated within the drop base of the rim, encircling spoke ends, to form a shield and support for the tire tube flush with the tire seats 25, 29 and 30.

In Fig. 3 the drop base 31 is riveted as indicated at 32 to the rim base proper 33 which has at the rear a rigid tire-retaining flange 34. The rim base 33 terminates forwardly short of the location of a front tire-retaining flange, overlying and forming a shield for the tenons 34 of the spokes 35 which are seated in apertures flanged at 36. The drop base 31 of the rim is upturned at 37 to form a gutter 38 for the reception of the removable tire-retaining ring or flange 39, the tire seat 40 on the removable ring being flush with the base 33 of the rim.

As illustrated in Figs. 1, 2 and 3, above described, it will be observed that the drop base of the rim forms in effect a felly within which the tenons of the spokes are received and anchored, this drop base extending circumferentially of the wheel. In the embodiments of the invention now to be described with reference to Figs. 4 to 7 inclusive there is no drop base but the function of the felly is performed by the rim itself, the spokes being seated directly in the rim base.

The structure illustrated in Figs. 4 and 5 is an adaptation of the ordinary Q. D. rim having the cylindrical base 41, the integral rear tire-retaining flange 42, the gutter 43 and the removable tire-retaining ring or flange 44. This rim base is apertured at points corresponding to the location of the spokes, the aperture being adapted to receive a metal ferrule 45 fitted about a spoke tenon 46 and flanged to form a seat 47 upon the shoulder of the spoke 48. This ferrule is flanged over from the position indicated in dotted lines at 49 to the position shown in full lines at 50, whereby a secure interlock is formed between the spoke ferrule and the rim. The rim base is slightly depressed about the apertures to accommodate the flanged-over portion 50 of the ferrule to constitute a surface flush with the tire seat on the base 41.

A similar type of rim is shown in Figs. 6 and 7. Herein the metal of the rim is inwardly flanged about the apertures as indicated at 51 while the spoke ferrule extends about the spoke end at 52 inwardly about the tenon as indicated at 53 laterally to seat upon the spoke shoulder as indicated at 54 and then outwardly at 55, the annular space between the ferrule portions 53 and 55 serving to accommodate the flanged portion 51 of the rim and whereby a secure interlock is effected.

In all of the embodiments illustrated and described, a considerable saving of weight of metal is accomplished about the periphery of the wheel, the spoke-felly-rim construction is simplified and the assembly of the parts facilitated.

I claim:

1. A tire-carrying rim comprising a cylindrical tire-seating rim base having an upwardly extending permanent tire-retaining flange at the rear and terminating forwardly short of the location of a front tire-retaining member, a felly secured to the underside of the cylindrical rim base and upturned at its front to provide a gutter beneath and in advance of the front edge of the cylindrical rim base, a removable tire-retaining ring seated within the gutter and having a tire-seating portion disposed substantially flush with and forming in effect a forward continuation of the cylindrical rim base.

2. In a felly and rim construction, a tire-carrying rim comprising a cylindrical tire-seating rim base having an upwardly extending permanent tire-retaining flange at the rear and terminating forwardly short of the location of a front tire-retaining member, a felly secured to the underside of the cylindrical rim base and upturned at its front to provide a gutter beneath and in advance of the front edge of the cylindrical rim base, a removable tire-retaining ring seated within the gutter and having a tire-seating portion disposed substantially flush with and forming in effect a forward continuation of the cylindrical rim base, the felly apertured at intervals corresponding to the location of spokes, spokes having tenons seated within the apertures and having their ends terminating inwardly of and beneath the cylindrical rim base, the said cylindrical rim base forming a shield between the tire tube and the spoke ends.

In testimony whereof I have hereunto subscribed my name.

EMIL A. NELSON.